US011462241B2

(12) United States Patent
Kasada et al.

(10) Patent No.: US 11,462,241 B2
(45) Date of Patent: *Oct. 4, 2022

(54) MAGNETIC RECORDING MEDIUM

(71) Applicant: FUJIFILM Corporation, Tokyo (JP)

(72) Inventors: Norihito Kasada, Minami-ashigara (JP); Akinori Sugishima, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 537 days.

This patent is subject to a terminal disclaimer.

(21) Appl. No.: 16/009,570

(22) Filed: Jun. 15, 2018

(65) Prior Publication Data

US 2018/0374505 A1     Dec. 27, 2018

(30) Foreign Application Priority Data

Jun. 23, 2017 (JP) .............................. JP2017-123041

(51) Int. Cl.
*G11B 5/702* (2006.01)
(52) U.S. Cl.
CPC .................................. *G11B 5/702* (2013.01)
(58) Field of Classification Search
CPC ...................................................... G11B 5/702
See application file for complete search history.

(56) References Cited

U.S. PATENT DOCUMENTS

| | | | |
|---|---|---|---|
| 4,590,524 A | 5/1986 | Okamoto et al. |
| 4,727,438 A | 2/1988 | Juso et al. |
| 4,988,562 A | 1/1991 | Ryoke et al. |
| 5,305,159 A | 4/1994 | Sakai et al. |
| 5,544,140 A | 8/1996 | Seagrave et al. |
| 5,606,469 A | 2/1997 | Kosugi et al. |
| 6,033,760 A | 3/2000 | Wakana et al. |
| 6,579,592 B1 | 6/2003 | Matsubaguchi et al. |
| 6,744,585 B1 | 6/2004 | Nishida et al. |
| 7,092,199 B2 | 8/2006 | Nakamura et al. |
| 7,187,511 B2 | 3/2007 | Nakao |
| 7,494,728 B2 | 2/2009 | Kuse et al. |
| 7,532,425 B2 | 5/2009 | Abe et al. |
| 7,755,863 B2 | 7/2010 | Neumann et al. |
| 8,861,111 B1 | 10/2014 | Liao et al. |
| 8,947,821 B1 | 2/2015 | Blinick et al. |
| 9,928,854 B1 | 3/2018 | Jury et al. |
| 9,978,414 B1 | 5/2018 | Kaneko et al. |
| 10,074,393 B2 | 9/2018 | Kaneko et al. |
| 10,504,546 B2 | 12/2019 | Kaneko et al. |
| 10,510,369 B2 | 12/2019 | Kaneko et al. |
| 10,643,646 B2 | 5/2020 | Kasada et al. |
| 10,643,647 B2 | 5/2020 | Kasada et al. |
| 10,679,655 B2 | 6/2020 | Ozawa et al. |
| 10,692,528 B2 | 6/2020 | Ozawa et al. |
| 10,706,875 B2 | 7/2020 | Kasada et al. |
| 10,755,735 B2 | 8/2020 | Ozawa et al. |
| 10,755,741 B2 | 8/2020 | Ozawa et al. |
| 10,789,981 B2 | 9/2020 | Musha |
| 2003/0095353 A1 | 5/2003 | Nakao |
| 2003/0142431 A1 | 7/2003 | Eijiri et al. |
| 2006/0068232 A1 | 3/2006 | Mikamo et al. |
| 2006/0119969 A1 | 6/2006 | Hutchins et al. |
| 2011/0110210 A1 | 5/2011 | Honma |
| 2012/0003503 A1 | 1/2012 | Mori |
| 2012/0196156 A1 | 8/2012 | Suzuki |
| 2012/0244387 A1 | 9/2012 | Mori et al. |
| 2014/0272474 A1 | 9/2014 | Kasada |
| 2015/0029608 A1 | 1/2015 | Mathew et al. |
| 2016/0064025 A1 | 3/2016 | Kurokawa et al. |
| 2016/0093322 A1 | 3/2016 | Kasada et al. |
| 2016/0171993 A1 | 6/2016 | Okubo |
| 2017/0004856 A1 | 1/2017 | Tada et al. |
| 2017/0186460 A1 | 6/2017 | Kasada et al. |
| 2017/0372738 A1 | 12/2017 | Kasada |
| 2018/0082710 A1 | 3/2018 | Tada et al. |
| 2018/0358044 A1 | 12/2018 | Shirata et al. |
| 2018/0358046 A1 | 12/2018 | Shirata et al. |
| 2018/0374503 A1 | 12/2018 | Kasada |
| 2018/0374504 A1 | 12/2018 | Kasada |
| 2018/0374506 A1 | 12/2018 | Kasada |
| 2018/0374507 A1 | 12/2018 | Kasada |
| 2019/0295586 A1 | 9/2019 | Kasada |
| 2019/0295589 A1 | 9/2019 | Kasada |
| 2020/0005814 A1 | 1/2020 | Kasada et al. |
| 2020/0005817 A1 | 1/2020 | Ozawa et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |
| 2020/0005828 A1 | 1/2020 | Ozawa et al. |

(Continued)

FOREIGN PATENT DOCUMENTS

| | | | |
|---|---|---|---|
| JP | 59-221830 A | 12/1984 |
| JP | 1-318953 A | 12/1989 |

(Continued)

OTHER PUBLICATIONS

Notice of Allowance dated Feb. 20, 2020 in U.S. Appl. No. 16/456,745.
Notice of Allowance dated Feb. 25, 2020 in U.S. Appl. No. 16/456,459.
Notice of Allowance dated Jan. 13, 2020 in U.S. Appl. No. 16/456,970.
Notice of Allowance dated Jan. 31, 2020 in U.S. Appl. No. 16/456,811.
Notice of Allowance dated Mar. 13, 2020 in U.S. Appl. No. 16/456,831.
Notice of Allowance dated May 5, 2020 in U.S. Appl. No. 16/456,965.
Office Action dated Feb. 24, 2020 in U.S. Appl. No. 16/401,776.
Office Action dated Jan. 21, 2020 in U.S. Appl. No. 16/456,780.
Office Action dated Nov. 4, 2019 in U.S. Appl. No. 16/401,776.
U.S. Appl. No. 16/777,312, Pending.
U.S. Appl. No. 16/522,806, Pending.

(Continued)

*Primary Examiner* — Holly Rickman
(74) *Attorney, Agent, or Firm* — Sughrue Mion, PLLC

(57) ABSTRACT

The magnetic recording medium includes a non-magnetic support; and a magnetic layer including ferromagnetic powder and a binding agent on the non-magnetic support, in which an isoelectric point of a surface zeta potential of the magnetic layer is equal to or smaller than 3.8.

8 Claims, No Drawings

(56) References Cited

U.S. PATENT DOCUMENTS

| | | |
|---|---|---|
| 2020/0035267 A1 | 1/2020 | Kasada |
| 2020/0251134 A1 | 8/2020 | Kasada et al. |
| 2020/0251140 A1 | 8/2020 | Ozawa et al. |
| 2021/0082464 A1 | 3/2021 | Ozawa et al. |
| 2021/0249043 A1 | 8/2021 | Kasada et al. |
| 2022/0005503 A1 | 1/2022 | Kasada et al. |
| 2022/0005504 A1 | 1/2022 | Kasada |

FOREIGN PATENT DOCUMENTS

| | | | |
|---|---|---|---|
| JP | H 02-168415 A | 6/1990 | |
| JP | 3-109701 A | 5/1991 | |
| JP | 09-190623 A | 7/1997 | |
| JP | 2002-008910 A | 1/2002 | |
| JP | 2006-054018 A | 2/2006 | |
| JP | 2008-282501 A | 11/2008 | |
| JP | 2009-32338 A | 2/2009 | |
| JP | 2011-134372 A | 7/2011 | |
| JP | 2012-14809 A | 1/2012 | |
| JP | 2012-155805 A | 8/2012 | |
| JP | 2012-203956 A | 10/2012 | |
| JP | 2016-110680 A | 6/2016 | |
| JP | 2019-008847 A | 1/2019 | |
| JP | 2019-008849 A | 1/2019 | |
| JP | 2019-008850 A | 1/2019 | |
| JP | 2019-008851 A | 1/2019 | |
| JP | 6691512 B2 | 4/2020 | |
| JP | 6691513 B2 | 4/2020 | |
| JP | 6691514 B2 | 4/2020 | |

OTHER PUBLICATIONS

Office Action dated Jun. 30, 2020 from the U.S. Patent and Trademark Office in U.S. Appl. No. 16/777,312.
Office Action dated Oct. 22, 2020 from the U.S. Patent and Trademark Office in U.S. Appl. No. 16/777,312.
Office Action dated Mar. 3, 2020 by the Japanese Patent Application No. 2017-123041.
Office Action dated Jan. 12, 2021 in Japanese Application No. 2020-177690, corresponds to U.S. Appl. No. 16/522,806.
Office Action dated Jan. 21, 2021 in U.S. Appl. No. 16/522,806.
Hanaor et al., "Anodic aqueous electrophoretic deposition of titanium dioxide using carboxylic acids as dispersing agents", Journal of the European Ceramic Society, 2011, vol. 31, No. 6, pp. 1041-1047.
Notice of Allowance dated Jan. 27, 2021 in U.S. Appl. No. 16/777,312.
Notice of Allowance dated Mar. 16, 2021 in U.S. Appl. No. 16/777,312.
Office Action dated Apr. 27, 2021 in Japanese Application No. 2020-122791, corresponds to U.S. Appl. No. 17/022,919.
Notice of Allowance dated Jul. 13, 2021 in U.S. Appl. No. 16/522,806.
Office Action dated Aug. 31, 2021 in U.S. Appl. No. 17/022,919.
U.S. Appl. No. 17/477,087, filed Sep. 16, 2021 (Kasada).
U.S. Appl. No. 16/777,312, U.S. Pat. No. 11,0456,141.
U.S. Appl. No. 16/522,806, Allowed.
U.S. Appl. No. 16/009,570,, Allowed.
U.S. Appl. No. 17/242,798, Pending.
U.S. Appl. No. 17/022,919, Pending.
U.S. Appl. No. 17/476,565, Pending.
U.S. Appl. No. 17/477,087, Pending.
U.S. Appl. No. 16/456,745, U.S. Pat. No. 10,679,655.
U.S. Appl. No. 16/456,831, U.S. Pat. No. 10,706,875.
U.S. Appl. No. 16/456,970, U.S. Pat. No. 10,643,646.
U.S. Appl. No. 16/456,965, U.S. Pat. No. 10,755,735.
U.S. Appl. No. 16/456,811, U.S. Pat. No. 10,643,647.
U.S. Appl. No. 16/456,780, U.S. Pat. No. 10,755,741.
U.S. Appl. No. 16/456,459, U.S. Pat. No. 10,692,528.
U.S. Appl. No. 16/401,776, U.S. Pat. No. 10,789,981.
Office Action dated Nov. 8, 2021 in U.S. Appl. No. 17/242,798.
Office Action dated Dec. 7, 2021 in Japanese Application No. 2019-016523, corresponds to U.S. Appl. No. 17/242 798.
Office Action dated Feb. 14, 2022 in U.S. Appl. No. 17/022,919.
Notice of Allowance dated Mar. 15, 2022 in U.S. Appl. No. 17/242,798.
Office Action dated Mar. 24, 2022 in U.S. Appl. No. 16/522,806.
Office Action dated May 25, 2022 in U.S. Appl. No. 17/476,565.
Notice of Allowance dated Jul. 11, 2022 in U.S. Appl. No. 16/522,806.

MAGNETIC RECORDING MEDIUM

CROSS-REFERENCE TO RELATED APPLICATIONS

This application claims priority under 35 U.S.C 119 to Japanese Patent Application No. 2017-123041 filed on Jun. 23, 2017. The above application is hereby expressly incorporated by reference, in its entirety, into the present application.

BACKGROUND OF THE INVENTION

1. Field of the Invention

The present invention relates to a magnetic recording medium.

2. Description of the Related Art

A magnetic recording medium including a magnetic layer including ferromagnetic powder and a binding agent on a non-magnetic support is called a coating type magnetic recording medium and is widely used as recording medium for various purposes (for example, see JP1997-190623A (JP-H09-190623A).

SUMMARY OF THE INVENTION

In recent years, a magnetic recording medium such as a magnetic tape used for data storage may be used in a low temperature and low humidity environment (for example, in an environment of a temperature of 10° C. to 15° C. and relative humidity of approximately 10% to 20%) such as a data center or the like, in which a temperature and humidity are controlled. Meanwhile, from a viewpoint of reducing air conditioning cost for controlling a temperature and humidity, it is desirable that the controlling conditions of a temperature and humidity during use can be further alleviated than current conditions or it is desirable to make the control unnecessary.

In consideration of such circumstances, the inventors have made studies so as to alleviate controlling conditions of a temperature and humidity during use of a magnetic recording medium or to make the controlling unnecessary. As a result, it is determined that, in an environment in which controlling conditions of a temperature and humidity are alleviated or the controlling thereof is not necessary (hereinafter, referred to as "in a high temperature and high humidity environment"), in a case of reproducing information recorded on a magnetic recording medium, a frequency of generation of a partial decrease in reproducing signal amplitude (referred to as "missing pulse") increases. The high temperature and high humidity environment is an environment in which an atmosphere temperature is 30° C. to 45° C. and relative humidity is equal to or greater than 65% (for example, 65% to 90%). As the generation frequency of the missing pulse increases, an error rate increases and reliability of a magnetic recording medium is deteriorated. Accordingly, in order to use a magnetic recording medium with high reliability in the high temperature and high humidity environment, it is desired to decrease the generation frequency of the missing pulse in the high temperature and high humidity environment.

Therefore, an object of the invention is to provide a magnetic recording medium in which generation frequency of missing pulse in the high temperature and high humidity environment is decreased.

According to one aspect of the invention, there is provided a magnetic recording medium comprising: a non-magnetic support; and a magnetic layer including ferromagnetic powder and a binding agent on the non-magnetic support, in which an isoelectric point of a surface zeta potential of the magnetic layer is equal to or smaller than 3.8.

In one aspect, the isoelectric point may be 2.5 to 3.8.

In one aspect, the binding agent may be a binding agent including an acidic group.

In one aspect, the acidic group may include at least one kind of acidic group selected from the group consisting of a sulfonic acid group and a salt thereof.

In one aspect, the magnetic recording medium may further comprise a non-magnetic layer including non-magnetic powder and a binding agent between the non-magnetic support and the magnetic layer.

In one aspect, the magnetic recording medium may further comprise a back coating layer including non-magnetic powder and a binding agent on a surface side of the non-magnetic support opposite to a surface side provided with the magnetic layer.

According to one aspect of the invention, it is possible to provide a magnetic recording medium in which generation frequency of missing pulse in the high temperature and high humidity environment is decreased.

DESCRIPTION OF THE PREFERRED EMBODIMENTS

One aspect of the invention relates to a magnetic recording medium including: a non-magnetic support; and a magnetic layer including ferromagnetic powder and a binding agent on the non-magnetic support, in which an isoelectric point of a surface zeta potential of the magnetic layer is equal to or smaller than 3.8.

Hereinafter, the magnetic recording medium will be described more specifically.

Magnetic Layer

Isoelectric Point of Surface Zeta Potential of Magnetic Layer

In the magnetic recording medium, the isoelectric point of the surface zeta potential of the magnetic layer is equal to or smaller than 3.8. In the invention and the specification, the isoelectric point of the surface zeta potential of the magnetic layer is a value of pH, in a case where a surface zeta potential of the magnetic layer measured by a flow potential method (also referred to as a flow current method) becomes zero. A sample is cut out from the magnetic recording medium which is a measurement target, and the sample is disposed in a measurement cell so that the surface of the magnetic layer which is a target surface for obtaining the surface zeta potential comes into contact with an electrolyte. Pressure in the measurement cell is changed to flow the electrolyte and a flow potential at each pressure is measured, and then, the surface zeta potential is obtained by the following calculation expression.

$$\zeta = \frac{dI}{dp} \times \frac{\eta}{\varepsilon\varepsilon_0} \frac{L}{A} \quad \text{(Calculation Expression)}$$

[ζ: surface zeta potential, p: pressure, I: flow potential, η: viscosity of electrolyte, ε: relative dielectric constant, $\varepsilon_0$:

dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potentials of each measurement point of pH is obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the magnetic layer measured by the flow potential method is zero, is obtained.

The above measurement is performed three times in total at room temperature by using different samples cut out from the same magnetic recording medium (magnetic recording medium which is a measurement target), and pH, in a case where the surface zeta potential of each sample is zero, is obtained. For the viscosity and the relative dielectric constant of the electrolyte, a measurement value at room temperature is used. The room temperature is set as 20° C. to 27° C. An arithmetical mean of three pHs obtained as described above is an isoelectric point of the surface zeta potential of the magnetic layer of the magnetic recording medium which is a measurement target. In addition, as the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used.

The isoelectric point of the surface zeta potential measured by the method described above is an isoelectric point obtained regarding the surface of the magnetic layer, unlike an isoelectric point of ferromagnetic powder included in a magnetic layer disclosed in JP1997-190623A (JP-H09-190623A), for example. As a result of the intensive studies, the inventors have newly found that, by setting the isoelectric point of the surface zeta potential of the magnetic layer to be equal to or smaller than 3.8, it is possible to decrease a generation frequency of a missing pulse, in a case of reproducing information recorded on the magnetic recording medium in the high temperature and high humidity environment. In regards to this point, the inventors have surmised as follows. However, the following description is merely a surmise, and the invention is not limited thereto.

It is thought that scraps (may be referred to as debris) are generated due to chipping of the surface of the magnetic layer due to the contact between the surface of the magnetic layer and a reproducing head, in a case of reproducing information recorded on the magnetic recording medium. The inventors have surmised that, in a case where the scraps are strongly stuck to the surface of the magnetic layer, a contact state between the surface of the magnetic layer and the reproducing head is not stabilized, thereby partially decreasing a reproducing signal amplitude (missing pulse). With respect to this, the inventors have thought that, in a case of using the magnetic layer in which the isoelectric point of the surface zeta potential is in a region of acidic pH equal to or smaller than 3.8, a repulsive force may be easily applied between the scraps generated from this magnetic layer and the surface of the magnetic layer. The inventors have surmised that preventing the scraps from being strongly stuck to the surface of the magnetic layer by this repulsive force may contribute to a decrease in generation of missing pulse.

From a viewpoint of further decreasing the generation frequency of the missing pulse, the isoelectric point of the surface zeta potential of the magnetic layer is preferably equal to or smaller than 3.7, more preferably equal to or smaller than 3.6, even more preferably equal to or smaller than 3.5, still more preferably equal to or smaller than 3.4, and still even more preferably equal to or smaller than 3.3.

As will be described later in detail, the isoelectric point of the surface zeta potential of the magnetic layer can be controlled by the kind of a component used for forming the magnetic layer, a formation step of the magnetic layer, and the like. From a viewpoint of availability of a component (for example, binding agent) used for forming the magnetic layer, the isoelectric point of the surface zeta potential of the magnetic layer is preferably equal to or greater than 2.5, more preferably equal to or greater than 2.6, and even more preferably equal to or greater than 2.7.

However, the invention is not limited to the above surmise and other surmises described in the specification.

Next, the magnetic layer will be described more specifically.

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic recording medium in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent and one or more kinds of additives may be randomly included. A high filling percentage of the ferromagnetic powder in the magnetic layer is preferable from a viewpoint of improvement recording density.

Binding Agent and Curing Agent

The magnetic recording medium is a coating type magnetic recording medium and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an acidic group can be used. The acidic group of the invention and the specification is used as a meaning including a state of a group capable of emitting $H^+$ in water or a solvent including water (aqueous solvent) to dissociate anions and a salt thereof. Specific examples of the acidic group include a sulfonic acid group, a sulfate group, a carboxyl group, a phosphate group, and a salt thereof. For example, a salt of sulfonic acid group (—SO3H) is represented by —SO3M, and M represents a group representing an atom (for example, alkali metal atom or the like) which may be cations in water or in an aqueous solvent. The same applies to aspects of salts of various groups described above. As an example of the binding agent including the acidic group, a resin including at least one kind of acidic group selected from the group consisting of a sulfonic acid group and a salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In regards to the controlling of the isoelectric point of the surface zeta potential of the magnetic layer, the inventors have surmised that formation of the magnetic layer so that the acidic component is unevenly distributed to a surface portion of the magnetic layer contributes to a decrease in value of the isoelectric point. In addition, it is surmised that formation of the magnetic layer so as to decrease the amount of a basic component present in the surface portion of the magnetic layer also contributes to a decrease in value of the isoelectric point. The acidic component is used as a meaning including a state of a component capable of emitting $H^+$ in water or an aqueous solvent to dissociate anions and a salt thereof. The basic component is used as a meaning including a state of a component capable of emitting $OH^-$ in water or an aqueous solvent to dissociate cations and a salt thereof. For example, it is thought that, in a case of using the acidic component, uneven distribution of the acidic component to the surface portion of the magnetic layer contributes to a decrease in value of the isoelectric point of the surface zeta potential of the magnetic layer to control the isoelectric point to be equal to or smaller than 3.8. For example, the inventors have thought that, in a step of applying a magnetic layer forming composition onto a non-magnetic support directly or through a non-magnetic layer, the applying which is performed in an alternating magnetic field by applying an alternating magnetic field contributes to formation of a magnetic layer in which the acidic component is unevenly distributed to the surface portion. As the acidic component, for example, a binding agent including an acidic group can be used. In addition, the inventors have surmised that, in a case of using the binding agent including an acidic group, in a preparation step of the magnetic layer forming composition, the addition (additional addition) of the binding agent even in a case of mixing magnetic liquid and other components, after preparing a dispersion liquid (magnetic liquid) including ferromagnetic powder and the binding agent, contributes to formation of a magnetic layer in which the binding agent including the acidic group is unevenly distributed to the surface portion. The formation of the magnetic layer will be described later more specifically.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface side of the non-magnetic support opposite to the surface side provided with the magnetic layer. The back coating layer preferably includes any one or both of carbon black and inorganic powder. In regards to the binding agent included in the back coating layer and various additives which can be randomly included therein, a well-known technology regarding the treatment of the magnetic layer and/or the non-magnetic layer can be applied.

Various Thicknesses

A thickness of the non-magnetic support is preferably 3.00 to 20.00 μm, more preferably 3.00 to 10.00 μm, and even more preferably 3.00 to 6.00 μm.

A thickness of the magnetic layer can be optimized according to a saturation magnetization amount of a magnetic head used, a head gap length, a recording signal band, and the like. The thickness of the magnetic layer is normally 0.01 μm to 0.15 μm, and is preferably 0.02 μm to 0.12 μm and more preferably 0.03 μm to 0.10 μm from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.10 to 1.50 μm and is preferably 0.10 to 1.00 μm.

A thickness of the back coating layer is preferably equal to or smaller than 0.90 μm and even more preferably 0.10 to 0.70 μm.

The thicknesses of various layers of the magnetic recording medium and the non-magnetic support can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method of Magnetic Recording Medium

Each composition for forming the magnetic layer, and the non-magnetic layer and the back coating layer which are randomly provided, normally includes a solvent, together with various components described above. As the solvent, various organic solvents generally used for manufacturing a coating type magnetic recording medium can be used. The amount of the solvent in each layer forming composition is not particularly limited, and can be set to be the same as that of each layer forming composition of a typical coating type magnetic recording medium. Steps of preparing the composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, in the preparation of the magnetic layer forming composition, the binding agent including an acidic group can be separately added through two or more steps. It is preferable that a dispersion liquid is prepared by mixing some components including the ferromagnetic powder among the various components of the magnetic layer forming composition with the binding agent including an acidic group and dispersing the mixture in a solvent, and the binding agent including an acidic group is also added in a step of mixing the dispersion liquid with the remaining components and performing dispersing, because it is possible to contribute to the controlling of the isoelectric point of a surface zeta potential of the magnetic layer to be equal to or smaller than 3.8. In addition, it is preferable that the non-magnetic powder which can function as an abrasive dispersed separately from the ferromagnetic powder, and then other components such as the ferromagnetic powder is mixed and dispersed, in order to improve dispersibility of the ferromagnetic powder and the non-magnetic powder (abrasive).

In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, as a dispersion medium, at least one or more kinds of dispersion beads selected from the group consisting of glass beads and other dispersion beads can be used. As such dispersion beads, zirconia beads, titania beads, and steel beads which are dispersion beads having high specific gravity are suitable. These dispersion beads are preferably used by optimizing a particle diameter (bead diameter) and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed by directly applying the magnetic layer forming composition onto the surface of the non-magnetic support or performing multilayer coating with the non-magnetic layer forming composition in order or at the same time. For details of the coating for forming each layer, a description disclosed in a paragraph 0066 of JP2010-231843A can be referred to. In addition, the coating of the magnetic layer forming composition performed in an alternating magnetic field can contribute to the controlling of the isoelectric point of a surface zeta potential of the magnetic layer to be equal to or smaller than 3.8. The inventors have surmised that this is because, an acidic component (for example, the binding agent including an acidic group) is easily unevenly distributed to a surface portion of a coating layer of the magnetic layer forming composition due to the applied alternating magnetic field, and thus, by drying this coating layer, a magnetic layer in which the acidic component is unevenly distributed to the surface portion is obtained. However, this is merely a surmise. The applying of the alternating magnetic field can be performed by disposing a magnet in a coating device so that the alternating magnetic field is applied vertically to the surface of the coating layer of the magnetic layer forming composition. A magnetic field strength of the alternating magnetic field can be, for example, set as approximately 0.05 to 3.00 T. However, there is no limitation to this range. The "vertical" in the invention and the specification does not mean only a vertical direction in the strict sense, but also includes a range of errors allowed in the technical field of the invention. For example, the range of errors means a range of less than ±10° from an exact vertical direction.

For various other steps for manufacturing the magnetic recording medium, a well-known technology can be applied. For details of the various steps, descriptions disclosed in paragraphs 0067 to 0070 of JP2010-231843A can be referred to, for example. It is preferable that the coating layer of the magnetic layer forming composition is subjected to an alignment process, while the coating layer is wet (not dried). For the alignment process, various well-known technologies such as a description disclosed in a paragraph 0067 of JP2010-231843A can be used. In a case of performing the alignment process, it is preferable to apply a magnetic field (for example, DC magnetic field) for aligning the ferromagnetic powder with respect to the coating layer of the magnetic layer forming composition applied in the alternating magnetic field.

As described above, it is possible to obtain the magnetic recording medium according to one aspect of the invention. The magnetic recording medium can be a tape-shaped magnetic recording medium (magnetic tape) or can also be a disk-shaped magnetic recording medium (magnetic disk). For example, the magnetic tape is normally accommodated in a magnetic tape cartridge and the magnetic tape cartridge is mounted in a magnetic tape device (referred to as a drive). A servo pattern can also be formed in the magnetic tape by a well-known method, in order to allow head tracking servo to be performed in the drive. The controlling conditions of a temperature and humidity of an environment of the drive in a case of reproducing information recorded on the magnetic tape in the drive are alleviated or made unnecessary to be controlled, and thus, even in a case where the reproducing is performed in the high temperature and high humidity environment, it is possible to decrease the generation frequency of the missing pulse, as long as it is the magnetic recording medium according to one aspect of the invention.

EXAMPLES

Hereinafter, the invention will be described with reference to examples. However, the invention is not limited to aspects shown in the examples. "Parts" and "%" in the following description are based on mass.

A "binding agent A" described below is a $SO_3Na$ group-containing polyurethane resin (weight-average molecular weight: 70,000, $SO_3Na$ group: 0.20 meq/g).

A "binding agent B" described below is a vinyl chloride copolymer (product name: MR110, $SO_3K$ group-containing vinyl chloride copolymer, $SO_3K$ group: 0.07 meq/g) manufactured by Kaneka Corporation.

Manufacturing of Magnetic Tape

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List

Magnetic Liquid

Ferromagnetic powder: 100.0 parts
    Ferromagnetic hexagonal barium ferrite powder having average particle size (average plate diameter) of 21 nm Binding agent (see Table 1): see Table 1

Cyclohexanone: 150.0 parts

Methyl ethyl ketone: 150.0 parts

Abrasive Solution

Alumina dispersion prepared in the section (1): 6.0 parts
Silica Sol (projection forming agent liquid)
Colloidal silica (Average particle size: 120 nm) 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Tosoh Corporation): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
   Average particle size (average long axis length): 0.15 μm
   Average acicular ratio: 7
   BET specific surface area: 52 m$^2$/g
Carbon black: 20.0 parts
   Average particle size: 20 nm
Binding agent A: 18.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
   Average particle size (average long axis length): 0.15 μm
   Average acicular ratio: 7
   BET specific surface area: 52 m$^2$/g
Carbon black: 20.0 parts
   Average particle size: 20 nm
A vinyl chloride copolymer: 13.0 parts
Sulfonic acid group-containing polyurethane resin: 6.0 parts
Phenylphosphonic acid: 3.0 parts
Methyl ethyl ketone: 155.0 parts
Polyisocyanate: 5.0 parts
Cyclohexanone: 355.0 parts
(5) Preparation of Each Layer Forming Composition The magnetic layer forming composition was prepared by the following method.

The magnetic liquid was prepared by dispersing (beads-dispersing) each component by using a batch type vertical sand mill for 24 hours. Zirconia beads having a bead diameter of 0.5 mm were used as the dispersion beads.

The prepared magnetic liquid and abrasive solution, the binding agent A (0.1 parts with respect to 100.0 parts of the ferromagnetic powder of the magnetic liquid) to be additionally added, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method.

Each component excluding the lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method.

Each component excluding polyisocyanate and cyclohexanone was kneaded by an open kneader and diluted, and was subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness of 5.00 μm so that the thickness after the drying becomes 1.00 μm and was dried to form a non-magnetic layer.

Then, in a coating device disposed with a magnet for applying an alternating magnetic field, the magnetic layer forming composition prepared in the section (5) was applied onto the surface of the non-magnetic layer so that the thickness after the drying becomes 0.10 μm, while applying an alternating magnetic field (magnetic field strength: 0.15 T), to form a coating layer. The applying of the alternating magnetic field was performed so that the alternating magnetic field was applied vertically to the surface of the coating layer. After that, a homeotropic alignment process was performed by applying a magnetic field having a magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes 0.50 μm, and was dried to form a back coating layer.

After that, a surface smoothing treatment (calender process) was performed by using a calender roll configured of only a metal roll, at a speed of 100 m/min, linear pressure of 294 kN/m (300 kg/cm), and a calender temperature (surface temperature of a calender roll) of 100° C.

Then, the heat treatment was performed in the environment of the atmosphere temperature of 70° C. for 36 hours. After the heat treatment, the slitting was performed to have a width of ½ inches (0.0127 meters), and a servo pattern was formed on the magnetic layer by a commercially available servo writer.

By doing so, a magnetic tape of Example 1 was manufactured.

Examples 2 to 6 and Comparative Examples 1 to 8

A magnetic tape was manufactured by the same method as in Example, except that various conditions were changed as shown in Table 1.

In Table 1, in the examples and the comparative examples in which "performed" is shown in the column of the additional addition of the binding agent, the additional addition of the binding agent A (0.1 parts with respect to 100.0 parts of the ferromagnetic powder of the magnetic liquid) was performed in the same manner as in Example 1. On the other hand, in the comparative examples in which "not performed" is shown in this column, the additional addition of the binding agent A was not performed.

In Table 1, in the examples and the comparative examples in which "performed" is shown in the column of the alternating magnetic field application during coating, the step subsequent to the coating step of the magnetic layer forming composition was performed by the same method as in Example 1. That is, the application of the alternating magnetic field was performed during coating of the magnetic layer forming composition in the same manner as in Example 1. On the other hand, in the comparative examples in which "not performed" is shown in this column, the step subsequent to the coating step of the magnetic layer forming composition was performed by the same method as in Example 1, except that the application of the alternating magnetic field was not performed.

Evaluation of Physical Properties of Magnetic Tape (1) Isoelectric Point of Surface Zeta Potential of Magnetic Layer Six samples for isoelectric point measurement were cut out from each magnetic tape of the examples and the comparative examples and disposed in the measurement cell of two samples in one measurement. In the measurement cell, a sample installing surface and a surface of the back coating layer of the sample were bonded to each other by using a double-sided tape in upper and lower sample table (size of each sample installing surface is 1 cm×2 cm) of the measurement cell. Accordingly, in a case where an electrolyte flows in the measurement cell, the surface of the magnetic layer of the sample comes into contact with the electrolyte, and thus, the surface zeta potential of the magnetic layer can be measured. The measurement was performed three times in total by using two samples in each measurement, and the isoelectric points of the surface zeta potential of the magnetic layer were obtained. An arithmetical mean of the obtained three values was shown in Table 1, as the isoelectric point of the surface zeta potential of the magnetic layer of each magnetic tape. As a surface zeta potential measurement device, SurPASS manufactured by Anton Paar was used. The measurement conditions were set as follows. Other details of the method of obtaining the isoelectric point is as described above.

Measurement cell: variable gap cell (20 mm×10 mm)
Measurement mode: Streaming Current
Gap: approximately 200
Measurement temperature: room temperature
Ramp Target Pressure/Time: 400,000 Pa (400 mbar)/60 seconds
Electrolyte: KCl aqueous solution having concentration of 1 mmol/L (adjusted pH to 9)
pH adjusting solution: HCl aqueous solution having concentration of 0.1 mol/L or KOH aqueous solution having concentration of 0.1 mol/L
Measurement pH: pH 9→pH 3 (measured at 13 measurement points in total at interval of approximately 0.5

(2) Missing Pulse Generation Frequency

The following measurement was performed in the high temperature and high humidity environment of a temperature of 32° C. and relative humidity of 80%.

A magnetic tape cartridge accommodating each magnetic tape (magnetic tape total length of 500 m) of the examples and the comparative examples was set in a drive of Linear Tape-Open Generation 6 (LTO-G6) manufactured by IBM, and the magnetic tape was subjected to reciprocating running 1,500 times at tension of 0.6 N and a running speed of 8 m/sec.

The magnetic tape cartridge after the running was set in a reference drive (LTO-G6 drive manufactured by IBM), and the magnetic tape is allowed to run to perform the recording and reproducing. A reproducing signal during the running was introduced to an external analog/digital (AD) conversion device. A signal having a reproducing signal amplitude which is decreased 70% or more than an average (average of measured values at each track) was set as a missing pulse, a generation frequency (number of times of the generation) thereof was divided by the total length of the magnetic tape to obtain a missing pulse generation frequency (unit: times/m) per unit length (per 1 m) of the magnetic tape. In a case where the missing pulse generation frequency is equal to or smaller than 5.0 times/m, the magnetic tape can be determined as a magnetic tape having high reliability in practice.

The results of the above evaluation are shown in Table 1 (Table 1-1 and Table 1-2).

TABLE 1-1

|  |  |  | Example 1 | Example 2 | Example 3 | Example 4 | Example 5 | Example 6 |
|---|---|---|---|---|---|---|---|---|
| Formation of magnetic layer | Content of binding agent in magnetic liquid | Binding agent A | 5 parts | 10 parts | 15 parts | 20 parts | 0 parts | 10 parts |
|  |  | Binding agent B | 0 parts | 0 parts | 0 parts | 0 parts | 10 parts | 10 parts |
|  | Additional addition of binding agent |  | Performed | Performed | Performed | Performed | Performed | Performed |
|  | Alternating magnetic field application during coating |  | Performed | Performed | Performed | Performed | Performed | Performed |
| Isoelectric point of surface zeta potential of magnetic layer |  |  | 3.8 | 3.6 | 3.2 | 2.7 | 3.5 | 3.0 |
| Missing pulse generation frequency (times/m) |  |  | 3.5 | 3.1 | 2.8 | 2.0 | 3.3 | 3.0 |

TABLE 1-2

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Formation of magnetic layer | Content of binding agent in magnetic liquid | Binding agent A | 5 parts | 10 parts | 15 parts | 20 parts | 15 parts | 15 parts | 0 parts | 10 parts |
|  |  | Binding agent B | 0 parts | 0 parts | 0 parts | 0 parts | 0 parts | 0 parts | 10 parts | 10 parts |

TABLE 1-2-continued

|  | Comparative Example 1 | Comparative Example 2 | Comparative Example 3 | Comparative Example 4 | Comparative Example 5 | Comparative Example 6 | Comparative Example 7 | Comparative Example 8 |
| --- | --- | --- | --- | --- | --- | --- | --- | --- |
| Additional addition of binding agent | Not performed | Not performed | Not performed | Not performed | Performed | Not performed | Not performed | Not performed |
| Alternating magnetic field application during coating | Not performed | Not performed | Not performed | Not performed | Not performed | Performed | Not performed | Not performed |
| Isoelectric point of surface zeta potential of magnetic layer | 5.0 | 4.8 | 4.6 | 4.6 | 4.2 | 4.6 | 4.8 | 4.7 |
| Missing pulse generation frequency (times/m) | 12.5 | 6.2 | 5.8 | 5.7 | 5.4 | 5.8 | 6.0 | 5.9 |

From the results shown in Table 1, in the magnetic tapes of the examples in which the isoelectric point of the surface zeta potential of the magnetic layer is equal to or smaller than 3.8, it is possible to confirm that the generation frequency of the missing pulse in the high temperature and high humidity environment is small, compared to that in the magnetic tapes of the comparative examples.

One aspect of the invention is effective in a technical field of various magnetic recording medium such as a magnetic tape for data storage.

What is claimed is:

1. A magnetic recording medium comprising:
    a non-magnetic support; and
    a magnetic layer including ferromagnetic powder and a binding agent on the non-magnetic support,
    wherein an isoelectric point of a surface zeta potential of the magnetic layer is equal to or smaller than 3.8.

2. The magnetic recording medium according to claim 1, wherein the isoelectric point is 2.5 to 3.8.

3. The magnetic recording medium according to claim 1, wherein the binding agent is a binding agent including an acidic group.

4. The magnetic recording medium according to claim 3, wherein the acidic group includes at least one kind of acidic group selected from the group consisting of a sulfonic acid group and a salt thereof.

5. The magnetic recording medium according to claim 2, wherein the binding agent is a binding agent including an acidic group.

6. The magnetic recording medium according to claim 5, wherein the acidic group includes at least one kind of acidic group selected from the group consisting of a sulfonic acid group and a salt thereof.

7. The magnetic recording medium according to claim 1, further comprising:
    a non-magnetic layer including non-magnetic powder and a binding agent between the non-magnetic support and the magnetic layer.

8. The magnetic recording medium according to claim 1, further comprising:
    a back coating layer including non-magnetic powder and a binding agent on a surface side of the non-magnetic support opposite to a surface side provided with the magnetic layer.

* * * * *